United States Patent [19]
Tischler

[11] 3,719,313
[45] March 6, 1973

[54] CAR TOP LUGGAGE CARRIER
[75] Inventor: Ludwig J. Tischler, Huntington Woods, Mich.
[73] Assignee: F. L. Jacobs Co., Southfield, Mich.
[22] Filed: July 27, 1971
[21] Appl. No.: 166,483

[52] U.S. Cl. ..........................224/42.1 D, 287/20.5 R
[51] Int. Cl. ................................................B60m 9/00
[58] Field of Search ........224/42.1 D, 42.1 E, 42.1 F, 224/42.1 R, 29 R; 287/20.5 R, 23, 21

[56] References Cited

UNITED STATES PATENTS

| 3,193,228 | 7/1965 | Chion | 287/20.5 R X |
| 3,223,302 | 12/1965 | Helm | 224/42.1 F |

FOREIGN PATENTS OR APPLICATIONS

| 372,627 | 7/1939 | Italy | 224/42.1 E |

Primary Examiner—Gerald M. Forlenza
Assistant Examiner—Jerold M. Forsberg
Attorney—L. Gaylord Hulbe et al.

[57] ABSTRACT

The rail support assembly is for a vehicle top carrier where four or more rail support assemblies are mounted on the roof of a vehicle, with rails extending between adjacent assemblies to complete the carrier. Each rail support assembly comprises: a one piece resilient base which is adapted to conform to the curvature of the vehicle roof and is provided with a spherical section forming a dome; an upstanding tubular element having a spherical socket on one end seated on the dome; a locating plate having a spherical rim surrounding and engaging the socket on the tubular element, with the locating plate overlying flanges provided on the resilient base; and fastening means extending through the flanges and plate to secure the support assembly to the vehicle roof.

12 Claims, 8 Drawing Figures

INVENTOR.
LUDWIG J. TISCHLER,
BY Whittemore, Hulbert
& Belknap
ATTORNEYS

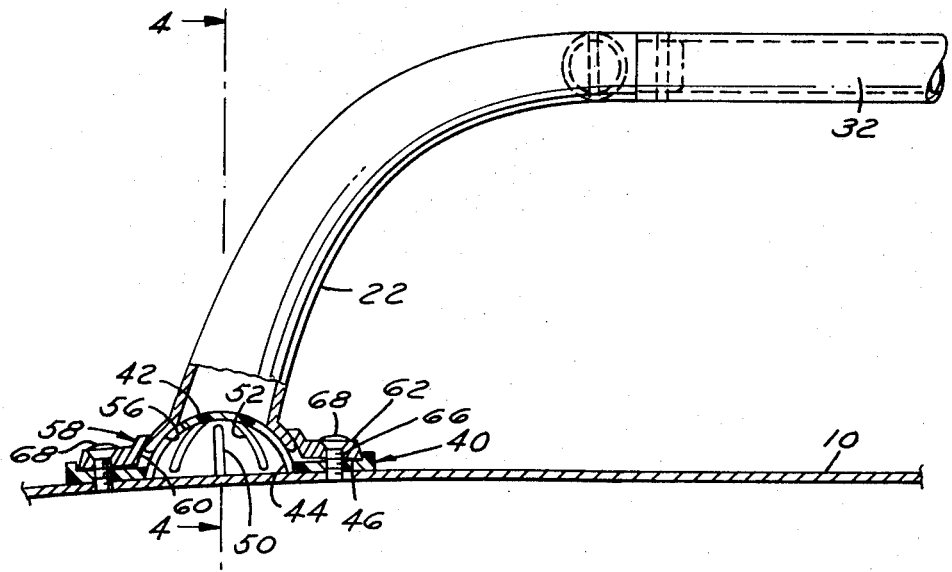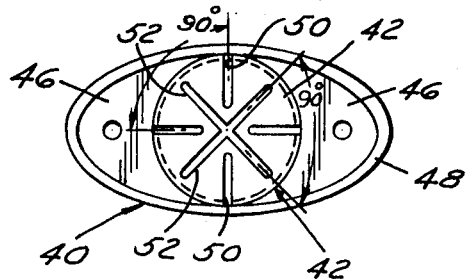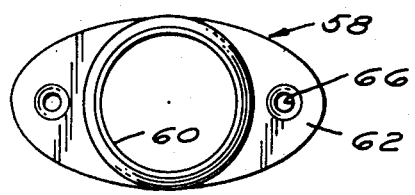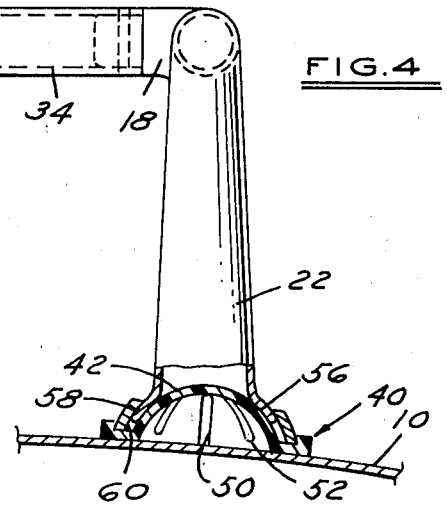

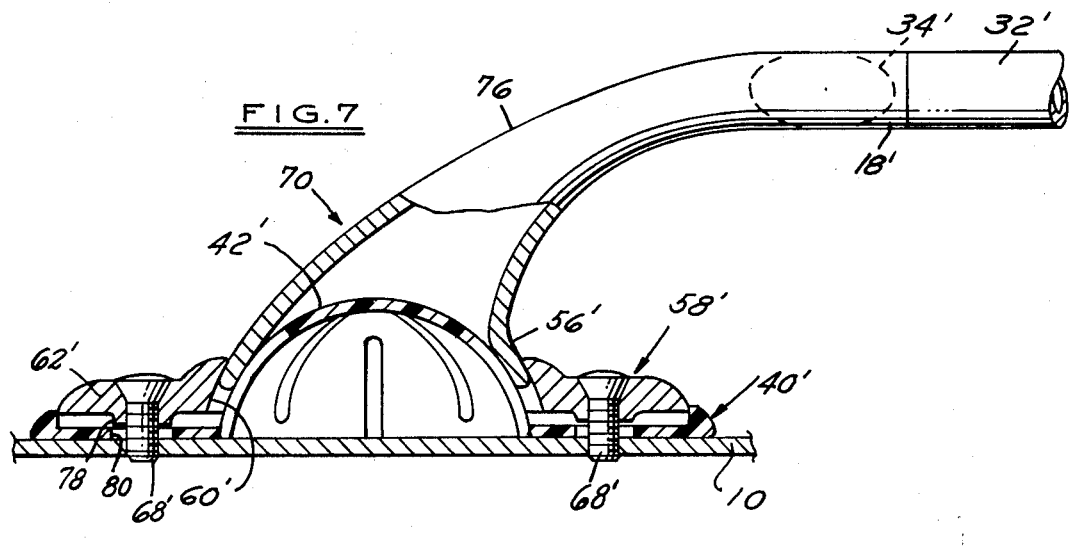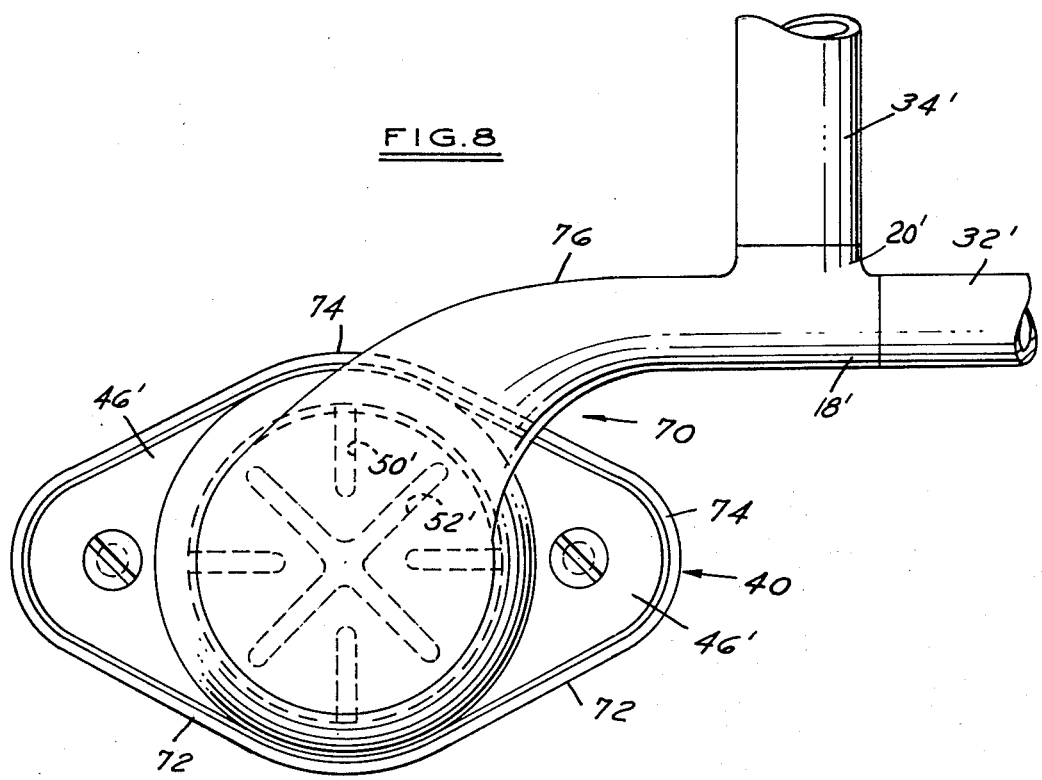

3,719,313

CAR TOP LUGGAGE CARRIER

BACKGROUND OF THE INVENTION

The vehicle top carrier is constructed to fit vehicle roofs of various shapes, sizes and contours and is designed to carry luggage or other items required to be transported. In the past it has been necessary to utilize a different rail support assembly for various makes of automobiles. With the present invention a standardized rail support assembly is provided, which includes a universal type resilient base yieldably adaptable for various shaped roofs.

SUMMARY OF THE INVENTION

The improved rail support assembly is of very simple and inexpensive construction and is one which includes components which may be utilized for different makes of automobiles. The vehicle top carrier comprises rail corner support assemblies mounted on the roof of the vehicle, with each assembly having a universal type resilient base made from a plastic material and which is adapted to yield and to conform to the shape of the roof.

The resilient base includes a spherical section forming a dome terminating in an annular rim at the base thereof, with the base being provided with mounting flanges adjacent and extending laterally from the annular rim. The resilient base is provided with a tubular element having on one end thereof a spherical seat or socket which surrounds and engages the dome. The other end of the tubular element is provided with a pair of collars. A locating plate having a spherical rim surrounds and engages the socket on the tubular element and holds the tubular element in a fixed position on the dome. Fastening means extend through the overlying flanges of the locating plate and base to secure same to the roof. Tubular rails extend between and are carried by opposing collars of adjacent support assemblies to complete the vehicle top carrier.

The resilient dome of the base is provided with a plurality of slots located 90° apart which extend from the annular rim at the base of the dome in a generally radial direction and terminate prior to reaching the center of the dome. The slots divide the dome into segments which are yieldable when required by the position of the tubular element thereon.

The dome further includes a pair of intersecting slots in the form of an "X" which extend across the center of the dome in a generally radial direction and terminate prior to reaching the annular rim at the base of the dome. The aforementioned pair of intersecting slots also divide the dome into segments which are yieldable as required by the position of the tubular element thereon. The opposing portions of the pair of intersecting slots are located 90° apart.

The base further includes an integral annular upstanding rim around the periphery thereof which is engageable with end portions of the flanges provided on the locating plate. The tubular element and locating plate are zinc die castings.

BRIEF DESCRIPTION OF THE DRAWINGS

FIG. 3 is a fragmentary side elevational view of one rail corner support assembly, partly in section;

FIG. 4 is a view, partly in section, taken along line 4—4 of FIG. 3;

FIG. 5 is a top view of the resilient base, with the other parts of the rail support assembly removed;

FIG. 6 is a bottom view of the resilient base of the rail support assembly;

FIG. 7 is a fragmentary side elevational view of a vehicle top carrier illustrating another embodiment of a rail support assembly; and FIG. 8 is a plan view of the rail support assembly illustrated in FIG. 7.

Referring now to FIG. 1, the roof of the vehicle is designated by the numeral 10. Mounted on the roof 10 is a vehicle top carrier 12 which includes four corner rail support assemblies 14 and one intermediate rail support assembly 16 at the front of the carrier 12. Each corner support assembly 14 is generally the same with the exception of the location of one of the collars 18, 20 on the upstanding tubular element or post 22 of each of the front rail support assemblies 14 as shown in FIG. 1. The collars 24, 25 on post 26 of the intermediate rail support assembly 16 are separated at a greater angle than the collars 18, 20. The front tubular rails 27, 28 each has one end received in a collar 20 and the other end in collar 24, 25 of post 26. The rails 17, 28 form a pointed nose on the front of carrier 12. The collars 18 receive the ends of the side tubular rails 30, 32 and the collars 20 at the rear of the carrier 12 receive the ends of the back tubular rail 34.

Figure 1:
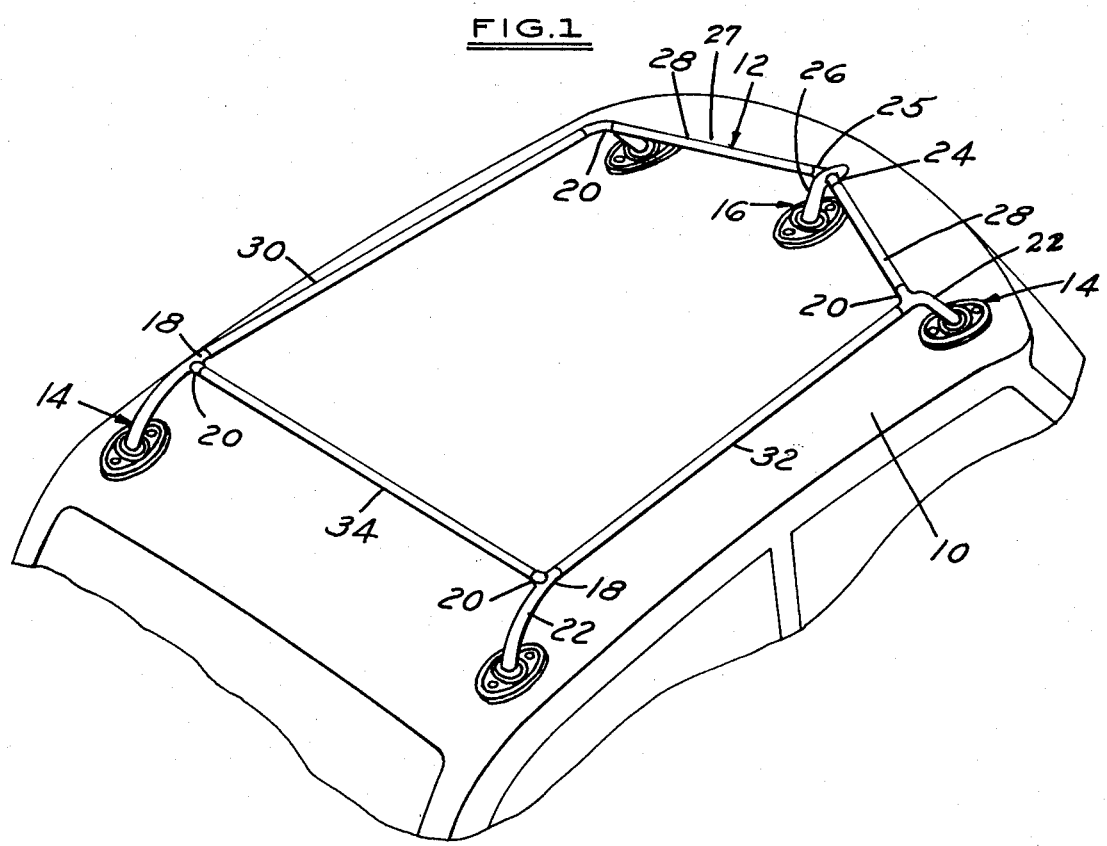
FIG. 1 is a perspective view of a vehicle top carrier mounted on the roof of a vehicle.
Figure 2:
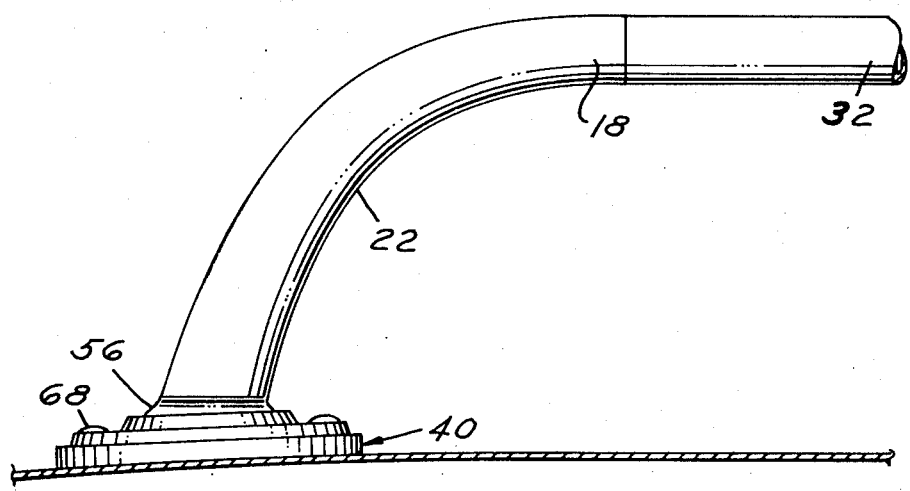
FIG. 2 is a fragmentary side elevation of the vehicle top carrier shown in FIG. 1 and illustrating one rail support assembly.

Each rail support assembly 14, 16 includes a one-piece resilient base 40 made from a yieldable material such as plastic which is adapted to conform to the contour or curvature of the roof 10. The base 40 includes a spherical section in the form of a dome 42 which terminates in an annular rim 44 at the base of the dome 42. The base 40 further includes a pair of flanges 46 extending laterally from the annular rim 44. An annular upstanding wall, lip or rim 48 is provided on the periphery of the base 40. The plastic base 40 may be made according to well known plastic forming or molding methods.

The dome 42 is provided with four elongated slots 50, spaced 90° apart, which extends from the annular rim 44 at the base of the dome 42 in a generally upward and radial direction. The dome 42 further includes a pair of intersecting elongated slots 52 which extend across the center of the dome 42 and extend downwardly in a generally radial direction and terminate prior to reaching the rim 44 on the dome 42. The slots 50 and 52 just described, best illustrated in FIG. 5, divide the spherical section or dome 40 into a plurality of yieldable segments which can deflect as required by the mounting of the tubular element or post 22, 26.

The tubular element 22, which is a zinc die casting, is provided on the lower end thereof with a spherical seat or socket 56. The socket 56 is mounted on the dome 42 with the tubular element 22 extending upwardly therefrom as shown in FIGS. 3 and 4. The socket 56 surrounds and engages the dome 42 as illustrated. In order to retain the tubular element 22 on the dome 42 in a predetermined position, a locating plate 58 is employed. The locating plate 58 includes a spherical rim 60 which surrounds and engages the socket or spherical seat 56 provided on the tubular element 22.

The locating plate 58 is provided with flanges 62 which overlie the flanges 46 provided on the yieldable base 40. The rim 48 engages portions of the locating plate 58 as shown in FIGS. 3 and 4. In order to secure the flanges 62, 46 provided on the locating plate 58 and base 40 respectively to the vehicle roof 10, openings 66 are provided therein in which are inserted threaded fastening elements 68 as illustrated. The spherical rim 60 on the plate 58 holds the tubular element or post 22 in a fixed position on the dome 42.

The other end of the tubular element 22 is provided with a pair of sockets 18, 20 which receive the ends of the steel tubing forming part of the car top luggage carrier 12 as described previously.

FIGS. 7 and 8 illustrate another embodiment of the present invention. The rail support assembly 70 includes the same elements as rail support assemblies 14 and 16 with the exception that such elements differ in shape, size and appearance. The yieldable base 40' is provided with a dome 42' intermediate flanges 46'. The base 40' is in the form of a parallelogram having four straight sides 72 with rounded or curved corners 74 as shown in FIG. 8.

The tubular element 76 has a different configuration than tubular element 20 and includes a socket or spherical seat 56' which engages the dome 42' and collars 18' and 20' for receiving the ends of rails 32' and 34'. The locating plate 58' has a spherical rim 60' which engages the socket 56' and holds the tubular element 76 in a fixed position.

The flanges 62' of locating plate 58' are provided with tubular collars 78 on the lower surfaces thereof which fit into the openings 80 in the base 40' when the fastening elements 68' are threaded to secure the plate 58' and base 40' to the roof 10'.

The dome 42' has slots 50' and 52' identical to the corresponding slots in FIG. 5. Thus the segments of the dome 42' intermediate slots 50' and 52' are yieldable and yield when required by the position of the tubular element 76.

The resilient base 40' is made from a plastic material. The tubular element 76 and the locating plates 58' are zinc die castings. The rail support assembly 70 illustrated in FIGS. 7 and 8 operates and functions in the same manner as the other embodiment.

What I claim as my invention is:

1. A rail support assembly for attachment to a vehicle roof comprising a one piece base made from a resilient material, said base having a spherical section forming a dome terminating in an annular rim at the base thereof, said base being provided with mounting flanges adjacent and extending laterally from said annular rim, said mounting flanges being adapted to conform to the curvature of the vehicle roof, said dome extending upwardly from said flanges, a tubular element having on one end thereof a seat, said seat surrounding and engaging said dome, a locating plate having a rim surrounding and engaging the seat on said tubular element, said plate having flanges overlying the flanges on said resilient base, and fastening means extending through said flanges to secure same to a vehicle roof, the rim on said plate holding said tubular element in a fixed position on said dome, the dome on said base being provided with a plurality of slots which permits portions of said dome to yield as required by the position of said tubular element.

2. A support assembly for attachment to a vehicle roof comprising a one piece base made from a resilient material, said base having a spherical section forming a dome terminating in an annular rim at the base thereof, said base being provided with mounting flanges adjacent and extending laterally from said annular rim, said mounting flanges being adapted to conform to the curvature of the vehicle roof, said dome extending upwardly from said flanges, a tubular element having on one end thereof a spherical seat, said seat surrounding and engaging said dome, a locating plate having a spherical rim surrounding and engaging the seat on said tubular element, said plate having flanges overlying the flanges on said resilient base, and fastening means extending through said flanges to secure same to a vehicle roof, the spherical rim on said plate holding said tubular element in a fixed position on said dome, the dome on said base being provided with a plurality of slots which permits portions of said dome to yield as required by the position of said tubular element.

3. The rail support assembly defined in claim 2 wherein said slots extend from the annular rim on said dome in a generally radial direction and terminate prior to reaching the center of said dome.

4. The rail support assembly defined in claim 3 wherein said slots are located 90° apart.

5. A rail support assembly for attachment to a vehicle roof comprising a one piece base made from a resilient material, said base having a spherical section forming a dome terminating in an annular rim at the base thereof, said base being provided with mounting flanges adjacent and extending laterally from said annular rim, said mounting flanges being adapted to conform to the curvature of the vehicle roof, said dome extending upwardly from said flanges, a tubular element having on one end thereof a spherical seat, said seat surrounding and engaging said dome, a locating plate having a spherical rim surrounding and engaging the seat on said tubular element, said plate having flanges overlying the flanges on said resilient base, and fastening means extending through said flanges to secure same to a vehicle roof, the spherical rim on said plate holding said tubular element in a fixed position on said dome, the dome of said base being provided with a pair of intersecting slots which extend across the center of the dome in a generally radial direction and terminate prior to reaching the annular rim on said dome, said slots permitting portions of said dome to yield as required by the position of said tubular element.

6. The rail support assembly defined in claim 5 wherein said pair of intersecting slots are located 90° apart.

7. A rail support assembly for attachment to a vehicle roof comprising a one piece base made from a resilient material, said base having a spherical section forming a dome terminating in an annular rim at the base thereof, said base being provided with mounting flanges adjacent and extending laterally from said annular rim, said mounting flanges being adapted to conform to the curvature of the vehicle roof, said dome extending upwardly from said flanges, a tubular element having on one end thereof a spherical seat, said seat surrounding and engaging said dome, a locating plate having a spherical rim surrounding and engaging the seat on said tubular element, said plate having flanges overlying the flanges on said resilient base, fastening means extending through said flanges to secure same to a vehicle roof, the spherical rim on said plate holding said tubular element in a fixed position on said dome, said dome being provided with four slots which extend from the annular rim on said dome in a generally radial direction and terminate prior to reaching the center of the dome, and a pair of intersecting slots which extend across the center of the dome and terminate prior to reaching the annular rim on said dome, said slots permitting portions of said dome to yield as required by the position of said tubular element.

8. The rail support assembly defined in claim 7 wherein adjacent slots on said dome are located 45° apart.

9. The rail support assembly defined in claim 2 wherein the other end of said tubular element is open and is adapted to receive the end of a tubular rail forming part of the structure for a luggage carrier.

10. The rail support assembly defined in claim 2 wherein said resilient base is made from a plastic material.

11. The rail support assembly defined in claim 10 wherein said base includes an annular upstanding rim around the periphery thereof engageable with end portions of said locating plate.

12. The rail support assembly defined in claim 2 wherein said tubular element and said locating plate are zinc die castings.

* * * * *